US012761013B2

(12) United States Patent
Hai Vidal et al.

(10) Patent No.: US 12,761,013 B2
(45) Date of Patent: Oct. 13, 2026

(54) METHOD AND SYSTEM FOR MAPPING AND RANGE DETECTION

(71) Applicant: LIDWAVE LTD., Jerusalem (IL)

(72) Inventors: Yehuda Hai Vidal, Jerusalem (IL); Uri Weiss, Mevo Beitar (IL)

(73) Assignee: LIDWAVE LTD., Jerusalem (IL)

( * ) Notice: Subject to any disclaimer, the term of this patent is extended or adjusted under 35 U.S.C. 154(b) by 233 days.

(21) Appl. No.: 18/696,649

(22) PCT Filed: Sep. 22, 2022

(86) PCT No.: PCT/IL2022/051016
§ 371 (c)(1),
(2) Date: Mar. 28, 2024

(87) PCT Pub. No.: WO2023/053111
PCT Pub. Date: Apr. 6, 2023

(65) Prior Publication Data

US 2024/0384979 A1 Nov. 21, 2024

(30) Foreign Application Priority Data

Sep. 29, 2021 (IL) .......................................... 286820

(51) Int. Cl.
*G01B 9/02015* (2022.01)
*G01B 9/02001* (2022.01)
*G01B 11/14* (2006.01)

(52) U.S. Cl.
CPC ..... *G01B 9/02028* (2013.01); *G01B 9/02007* (2013.01); *G01B 9/0201* (2013.01); *G01B 11/14* (2013.01)

(58) Field of Classification Search
CPC .............. G01B 9/02007; G01B 9/0201; G01B 9/02028; G01B 11/14
See application file for complete search history.

(56) References Cited

U.S. PATENT DOCUMENTS

2009/0147341 A1* 6/2009 Muenter .............. G01B 9/0209 359/238
2014/0268290 A1* 9/2014 Sebastian ................ G01S 7/497 359/279

(Continued)

FOREIGN PATENT DOCUMENTS

WO WO-0142735 A1 * 6/2001 ........... G01B 9/0203

OTHER PUBLICATIONS

Fischer, Edgar et al. "Overcoming coherence length limitation in two wavelength interferometry—an experimental verification". Optics Communications, vol. 123, No. 4-6, Feb. 1, 1996, pp. 465-472. (Year: 1996).*

*Primary Examiner* — Michael A Lyons
(74) *Attorney, Agent, or Firm* — Vorys, Sater, Seymour and Pease, LLP; Maryellen Feehery Hank

(57) ABSTRACT

An optical system, including one or more coherent light, an optical arrangement, and a detection unit, and respective method are described. The optical arrangement includes optical elements forming at least first and second interferometer loops, each including a reference arm and an interrogating arm and are associated with at least first and second detectors of the detection unit. Light propagating in the interrogating arm is directed at a target object via an output optical element and a reflection of light from said target object is collected by an input optical element. The detection unit is configured to determine data indicative of a relation between signals detected by the at least first and second detectors. One of the first and second interferometer loops includes a first noise generator positioned to affect light propagating in both of the corresponding reference and interrogating arms, thereby affecting coherence of light in the interferometer loops.

16 Claims, 3 Drawing Sheets

(56) References Cited

U.S. PATENT DOCUMENTS

| | | | | |
|---|---|---|---|---|
| 2017/0038192 | A1* | 2/2017 | Chen | G01B 9/02 |
| 2017/0127937 | A1* | 5/2017 | Fujii | G01B 9/02091 |
| 2020/0359903 | A1* | 11/2020 | Haji Reza | G01B 9/02081 |
| 2021/0025690 | A1* | 1/2021 | Tearney | G01B 9/02087 |
| 2021/0033380 | A1* | 2/2021 | Sternklar | G01B 9/0201 |

* cited by examiner

METHOD AND SYSTEM FOR MAPPING AND RANGE DETECTION

TECHNOLOGICAL FIELD

The present invention is generally in the field of distance measurements using electromagnetic (EM) signals reflected from a target object, e.g., usable for 3D mapping and determining distance of objects in a field of view.

BACKGROUND

Range detection of objects plays a key role in various applications ranging from navigation, security, mapping, biomedical applications, and more. The ability to provide accurate and sensitive range data is of high demand for development of autonomous vehicles, and other automated systems. Various range detection techniques utilize electromagnetic radiation in different wavelength ranges and respective properties of the radiation.

There are various well known range detection techniques utilizing electromagnetic (EM) waves. For example, Radar and Lidar systems enable detection of range of a target by utilizing the propagation speed of EM radiation to determine distance of target objects by determining time of travel of EM signals. Additional techniques, such as optical coherence tomography (OCT) exploit interference properties of EM radiation and variations in length of optical path.

GENERAL DESCRIPTION

The conventional range detection techniques, including techniques such as Time of Flight (TOF) and Frequency Modulated Continuous Wave (FMCW), generally determine range directly or indirectly using time delay and speed of light. These techniques typically require fast (within the gigahertz regime) and sensitive hardware. As a result, lowering costs typically reduce the detection range and/or sensitivity of these detection systems.

There is thus a need in the art for a novel range detection technique configured to provide data on distance from a range detection system to one or more target objects. The technique of the present invention may be implemented using relatively low-cost hardware and electronics and is capable of accurate distance measurement. Further, range and distance detection according to the present technique is generally independent of time related measurements and utilizes coherence properties of EM radiation for determining range to one or more selected objects.

More specifically, the present technique utilizes variation in coherence of EM signals, and a relation between the range to a target and the coherence length of the EM signal directed thereto. This relation is measurable using variation in contrast of interference (between maximal intensity and minimal intensity) and/or variation in amplitude at peak frequency of collected signal. The variation in coherence between the EM signals is described herein below and is generally associated with a relation (typically a ratio) between the coherence length and the distance passed by the signals.

Generally, the contrast between constructive interference peak and destructive interference low is associated with level of coherence of the mixed/interfering beam portions. Accordingly, reduced contrast between the peak and low of the interfering signal indicates lower coherence between the beams. In analyzing temporal spectrum of the collected interfering signal, coherence between the mixed/interfering beam portions is determined based on relative power/energy between peak frequency of the collected signal.

More specifically, in some configurations, the detector unit is operable for sampling the interfering signals at a selected sampling rate, providing a sequence of sampled signals. The sequences may be transformed to frequency domain, e.g., using Fourier transform. In the frequency domain, certain frequency shows peak variation, defined as peak frequency. The peak frequency may be at zero frequency (indicating minimal changes between sampling instances), certain frequency determined by phase modulation frequency of the phase modulator as described herein, or a different frequency that may indicate closing speed of the target object in accordance with Doppler Shift. The present technique may utilize relation between amplitude of peak frequency as detected by the first and second detectors, associated with first and second interference signals having different coherence properties (e.g., coherence length), to determine the coherence term Γ (Gamma) as described herein below, and accordingly determine distance to the target object.

It should be noted that coherence variation may be associated with reducing coherence length or increasing the coherence length. It should further be noted that where the present disclosure described the use of noise generator for variation of coherence length, the effect on coherence length may be by reducing and/or increasing. Further such noise generator should be understood broadly as relating to phase modulator, noise generator, optical amplifier, spectral filtering, or any other technique that can be used to vary coherence length of emitted radiation beam.

According to the technique, an EM source emits a beam of EM radiation of a selected wavelength range, the emitted beam is split into two or more portions, where one or more reference beams are directed along corresponding one or more reference arms, and one or more interrogating beams are directed toward the target object(s). Generally, the present technique utilizes plurality of either the interrogating or the reference beams, i.e., two or more reference beams and an interrogating beam, or two or more interrogating beams and a reference beam. Beam portions reflected from the target object(s) are collected and mixed/combined with selected reference beams, and the mixed/interference signals are measured. Thus, the detected signal related to interference between the collected beam portion after being reflected from the object, and the reference beam portion, and is generally indicative of relative phase variations between them. Relative delay or variation in length of path between the beam portions generally reduces coherence therebetween, affecting contrast of interference pattern (or frequency of the pattern). Accordingly, the present technique utilizes decrease/increase in coherence between signal portions, thereby causing variation (e.g., decrease) in contrast on the interference between them. The decrease in relative coherence between signal portions (interrogating and reference beams) may result in decrease in contrast between interference fringes. In this connection, the measured signal (for the exemplary case of Lorentzian beam spectrum) is described by equation 1:

$$I_{det} = \frac{1}{4}\left[I_1 + I_2 + 2 \cdot \sqrt{I_1 I_2} \cdot \cos(\varphi) e^{-\frac{r}{lc}}\right] \quad \text{(Equation 1)}$$

where $I_{det}$ is the measured mixed signal (integrated over a collection time), $I_1$ and $I_2$ are the collected reflection of the interrogating beam and the reference beam respectively, $l_c$ is the coherence length of the EM beam, r is the optical path difference, or difference between the distance traveled by the interrogating beam and the reference beam being indicative of range to a target object, and φ is a phase difference between the $I_1$ and $I_2$ beams. As described in more detail below, the present technique utilizes detection of the mixed signal while eliminating variation associated with phase difference φ between the $I_1$ and $I_2$ beams, to provide detection of relative coherence between the beams In this connection it should be noted that coherence is a property of an EM signal, relating to propagation distance of the signal, over which the wave maintains a specified degree of coherence. The coherence length of an EM signal typically behaves as a function of signal bandwidth and is proportional to $\lambda^2/(n\Delta\lambda)$. It should also be noted that the above equation 1 relates to Lorentzian beam spectrum. Reduction of interference contrast in accordance with coherence length is however typical for various beam spectra. For example, for Gaussian shaped beam spectrum, the interference contrast reduces exponentially by $$e^{\frac{-r^2}{l_c^2}}.$$

For simplicity of the description, the present technique is described herein assuming Lorentzian beam spectrum, it should however be noted that the present technique may be operated with various other spectral shapes of the beam.

Obtaining the distance to the object based on equation 1 using a single measurement is limited due to unknown data on reflectivity of the target, efficiency in collection of reflected light, etc. The present technique utilizes two or more measurements as described below to enable cancelation of such unknowns for determining distance to the target.

Further, it should also be noted that the present technique utilizes electromagnetic radiation of a selected wavelength/frequency range. The present technique may be used with RF radiation, microwave radiation, infrared radiation, visible light, ultraviolet radiation, etc. and may also operate using acoustic waves including ultrasonic and infrasonic signal. Accordingly, the terms optic or optical elements should be understood broadly as relating to suitable elements configured to manipulate wave-like radiation of the selected wavelength range. Further it should be understood that the terms interference and mixing may be used herein interchangeably when relating to generating phase sensitive sum of two EM beams. Additionally, it should be noted that the term light used herein as relating to EM radiation and is not limited to optical wavelength range as conventionally used.

As indicated above, the present technique utilizes control and variation of coherence lengths between the first and second reference beams, rather than variation in length of the reference arms. This enables selective variation of the coherence lengths, e.g., using controllable noise patterns, allowing increased dynamic range. More specifically, by proper selection of the coherence lengths, the present technique can be tuned for long distance measurements, or accuracy in short distance measurements, based on user requirements.

The present technique provides an optical system comprising one or more light sources providing one or more beams of coherent illumination of a selected wavelength range, an optical arrangement, and a detection unit. The optical arrangement is configured to direct a portion of beam toward a target, and a portion of the beam toward at least first and second reference paths. The optical arrangement further includes collection arrangement (e.g., one or more lenses, beam splitters, apertures, or other optical elements) configured for collecting portions of the beam reflected from the target and directing the collected beam to mix with beams of the first and second reference arms, providing at least first and second interfering signals. This configuration may form at least first and second interferometer loops, each comprising a reference arm and an interrogating arm, where the interrogating or reference arm may be common between the first and second interferometer loops. Where, each of the interferometer loops is configured to direct the interfering signal to be detected by a corresponding detector of the detection unit. The interrogating arms, being separate interrogating arms or a common interrogating arm, direct the interrogating beam portions toward a target.

Generally, the optical arrangement may include one or more lens arrangements positioned to direct the interrogating beam toward the target and for collecting beam portions reflected from the target. The one or more lens arrangements may be selected to determine field of view of target detection. More specifically, in some configurations the lens arrangement may be selected to provide relatively collimated interrogating beam for determining distance on a single object, utilizing detection unit having at least first and second detectors for detection of the first and second interfering signals. In some other configurations, the system may be configured to map distances to various items within a field of view, where the detection unit comprises at least first and second detector arrays. The lens arrangement is configured to direct the interrogating beam toward a field of view, and to collect reflected beam portions from the field of view for imaging the collected beam portions onto the first and second detector arrays. The at least first and second reference beams are respectively directed to the first and second detector arrays to provide interfering signals on the respective detector cells.

The present technique utilizes certain noise within signal propagation, thereby enabling to vary coherence relations between the interrogating beam and the first and second reference beams. Thus, effectively varying coherence length of EM beams travelling in the first and second interferometer loops. The introduced noise affects coherence between beam portions following (downstream of) the respective noise generators enabling variation of coherence relations between the beams. Generally, the introduced noise may be of any phase and/or amplitude pattern and may be selected in accordance with resulting coherence length generated by selected noise pattern. In some examples, the noise may be in the form of random, pseudo-random or selected pattern of phase or amplitude variations along the beam.

Thus, noise introduced to the interrogating beam downstream of splitting of the first reference beam does not affect relative coherence between them, but only affects phase difference cp. This is while noise introduced upstream to splitting second reference beam from the interrogating beam affects relative coherence, as paths (propagation length) of the beams are different.

Accordingly, this provides interfering signals obtained by at least first and second interferometer loops having different coherence length, while generally having similar reflection and coupling characteristics. The at least first and second interfering signals provide the present technique corresponding at least first and second measurements indicative of a distance to the target object. Generally, the present technique utilizes the at least first and second measurements indicative of distance, associated with the first and second interferometer loop, to determine distance irrespective of unknown data elements associated with reflectivity of the object target and energy loss in collection of the reflected signal. It should be noted that constant variation in reflection and/or coupling characteristics between the first and second interferometer loops may be resolved by calibration of the system to selected distances. Alternatively, such variation in reflection and/or coupling characteristics may be resolved by determining distance data by frequency detection as described above.

More specifically, detection of the interfering signals from the first and second interferometer loops provides data indicative of a range to the target. The at least first and second interfering signals provide level of coherence (associated with intensity and/or amplitude of peak beating-frequency) between the respective reference and interrogating beams. The optical system may be associated with a control circuit, e.g., a computer system comprising one or more processors and memory circuitry, for determining the target range based on the detected interfering signals. The control circuit may utilize pre-stored data indicative of emitted intensity of the first and second beams and may include additional pre-stored data as described in more detail further below.

As indicated above, the interference signal detected by the respective detector unit is exemplified for Lorentzian beams in equation 1. Accordingly, the resulting detected signal depends on amplitudes of the reference and interrogating beams, reflectance of the target, ratio between target range and coherence length, and relative phase between the reference and interrogating beams. To remove ambiguity associated with relative phase difference, the optical system may utilize a phase modulator affecting the interrogating beam (upstream or downstream of the target) for modulating phase thereof, providing periodic 2*r* phase modulation to collected signal, typically at a selected frequency. This enables to compensate for any phase difference, providing signal indicative of level of coherence. Alternatively, in some embodiments a phase difference between beams of the first and second interferometer loops may be selectively varied. This enables to determine detection signal associated with contrast between maximum and minimum interference intensities indicative of the target range. The detection signal may be determined in accordance with amplitude of the phase oscillation (in parallel to contrast of interference fringes) and omit the relative phase factor.

More specifically, the detection unit may operate for detecting interfering signals in selected sampling rate. Additionally, the phase modulator may apply varying phase between 0 and $2\pi$ so that each detection instance has slightly different phase shift between the reference and interrogating/collected beams. Frequency of operation of the phase modulator acts as beating frequency determining peak frequency, and considering selected number of detection instances, this measurement technique enables to determine the contrast between interference signals and thus determine coherence between the reference and interrogating/collected beams. Further, the detection unit may include analog processing of the interfering signal, e.g., to provide RMS (Root Mean Square) signal detection associated with contrast between the maximal and minimal interference signals. In some configurations, the detector units may be configured as RMS detectors providing output data indicative of RMS signal by analog processing.

To this end, the present technique utilizes first detection indicative of interference signals within the first interferometer loop, and second detection indicative of interference signal within the second interferometer loop to determine data on coherence level of the first and second interfering signals. Typically, the first and second detections may be operated for collecting interfering signals to provide level of coherence between the reference and interrogating signal portions thereof. To this end the present technique may utilize phase modulator affecting phase of at least one of the interrogating beam portions, collected beam portion, or the reference beam portions, to vary phase in selected cycles (e.g., $2\pi$ cycles) at a selected frequency, to thereby enable detection of contrast between maximal and minimal intensity of the interfering signal. Coherence level of the interfering signals can be determined in accordance with amplitude of peak frequency of collected interfering signal. The contrast in interference is described for example in equation 1 for the case of Lorentzian spectrum beams. In the general case, the contrast in the interference signal depends on a relation between distance to the target $\Delta x$ and coherence length of the emitted beam lc. Generally, the relation may be exponential (as for Lorentzian spectrum beam), exponential of quadratic (as for Gaussian spectrum beam) or other functions in accordance with the spectral shape of the beam. Using the first and second interferometer loops operating with beams of respective first and second different coherence lengths, the present technique enables determining distance to the target $\Delta x$ based on the respective interfering signals.

To simplify arrangement of the optical system, and to avoid the need of separating between collected EM signals associated with the first or second interferometer loops, the interrogating arms may be overlapping. More specifically, the first and second interferometer loops may utilize a common interrogating arm, directing EM beam toward the target, and common collection optics collecting beam reflected from the target. The collected beam is typically split to enable mixing/interference with reference beams of the first and second interferometer loops.

In some exemplary configurations, the optical system may comprise a light source unit configured for providing optical illumination having certain coherence length, an optical arrangement configured for directing one or more interrogating beams toward a target object and a collection unit configured for collecting at least a portion of light reflected from said target object, and a detection unit comprises at least first and second detectors. The optical arrangement comprises a beam splitting unit configured for splitting light from said light source unit to form the one or more interrogating beam and at least first and second reference signals. The collection unit comprises a light splitting unit configured to split collected light to at least first and second portions, directing the first and second portions to combine respectively with the first and second reference arms. The combined signals (interference signals) of the first and second portions of the collected light with the first and second reference signals are directed respectively to corresponding ones of the at least first and second detectors. The level of coherence of the detected interference signals is indicative of range/distance to the target. To vary coherence length of light portions between first and second interferometer loops, the optical arrangement further comprises at least one noise generator (e.g., random phase modulator) configured to apply selected variation to said one or more interrogating beam and/or one of the first and second reference arms. The noise variation may be random, pseudo-random, or other selected noise patterns. The noise generator may be configured as white noise generator, phase modulator, Optical Amplifier, e.g., Semiconductor Optical Amplifier Erbium-Doped Fiber Amplifier, or any other optical unit that can be configured to apply selected noise affecting at least phase of the emitted beam. The selected noise pattern (e.g., phase modulation pattern) is selected to increase/decrease coherence length of beam on which it is applied. The generally random noise causes a difference in coherence properties between said first and second interferometer loops, providing that the first and second interfering signals are formed by light of first and second different coherence lengths. Further, the use of random or pseudo-random noise enables selection of coherence length based on noise level. This is associated with pattern of the generated noise, noise frequency, noise amplitude, and statistical parameters of the noise such as autocorrelation, standard deviation, random walk step, etc.

The configuration of the range detection technique as described herein enables simultaneous detection of wide range of distances. More specifically, the present technique relies on detection of reducing coherence of EM radiation. Accordingly, the present technique enables combined detection of distances of a plurality of objects at different ranges. To this end, the interrogating beam may be transmitted with a divergence angle, providing a wide beam that covers certain field of view. Additionally, the detector unit may include two or more detector arrays, where different cells of the detector arrays are positioned to detect level of coherence of interference signal, caused by interference of a portion of collected radiation, at image plane, and a portion of respective reference beam. To this end, the collecting optics may be configured to collect reflected radiation from the field of view and image the collected radiation on an image plane, where the collected beam portions are split and interfered/mixed with respective portions of the at least first and second reference beams.

In this configuration, the detector arrays provide image data pieces, where a relation between corresponding pixels in the first and second detector arrays, provides data indicative of range to the respective point in the field of view. This configuration thus enables single shot acquisition of three-dimensional image data that includes data on range of different objects/points within the field of view. Such detector arrays may be one- or two-dimensional detector arrays. More specifically, the use of one-dimensional detector arrays provides one-dimensional image data, that can be scanned along a perpendicular axis to obtain two-dimensional image data.

Additionally, as indicated above, the present technique may utilize data on coherence part i.e., the amplitude of peak beating-frequency of the first and second interfering signals. This also enables the detection of doppler shift, associated with shift of peak frequency of the signals, for determining velocity of different points in the scene. Generally, without any variation between detection instances, the beating-frequency may equal to zero. Similarly, in analog processing, the signal may be generally constant, indicating zero beating frequency. Operation of the phase modulator at a selected frequency shifts the peak beating-frequency to operating frequency of the phase modulator. Further in case of moving target, Doppler shift further shifts the peak beating-frequency in accordance with closing speed of the target, thereby enabling to determine target speed as well as its distance.

Further, it should be noted that coherence of the first and second (or more) reference beams is different relative to the interrogating beam. In other words, the at least first and second interferometer loops utilize EM beams having different coherence lengths. This provides variation in coherence term of the detecting interfering signals as described by equation 1.

As indicated above, the present technique utilizes noise generator for affecting the coherence length of beams in the first and second interferometer loops, generally enabling to selectively vary their coherence lengths thereof. Generally, it may be preferred that at least one of the first and second coherence lengths (for the first and second interferometer loops) is of the order of the measured distance. Thus, selection of the coherence lengths may enable adjustment of sensitivity and accuracy of distance detection by the present technique for various distances In this connection, the noise generator may for example be configured as random phase modulator, optical amplifier, or other suitable techniques, applying a noise pattern affecting EM radiation passing therethrough. Selection of noise patterns enables adjustment of selected coherence lengths for the EM beams of the first and second interferometer loops.

Thus, according to a broad aspect, the present invention provides an optical system comprising one or more light sources providing coherent illumination of a selected wavelength range, an optical arrangement, and a detection unit; said optical arrangement comprises optical elements forming at least first and second interferometer loops, each comprising a reference arm and an interrogating arm, said at least first and second interferometer loops being associated with corresponding at least first and second detectors of the detection unit; light propagating in said interrogating arm is directed at a target object via an output optical element and a reflection of light from said target object is collected by an input optical element; said detection unit comprises at least first and second detectors configured for detection of interfering signals of the respective one of the first and second interferometer loops, said detection unit is configured to determine data indicative of a relation between signals detected by the at least first and second detectors; wherein, one of said first and second interferometer loops comprises a first noise generator positioned to affect light propagating in both of the corresponding reference and interrogating arms, thereby affecting coherence of light in said interferometer loops.

According to some embodiments, a ratio between measured signal of the at least first and second interferometer loops may be indicative of range to said target object.

According to some embodiments, the at least first and second detectors may be configured for providing output signal indicative of coherence term between respective beam components of the reference and interrogating arms.

According to some embodiments, the interrogating arm may be common between said first and second interferometer loops, and wherein said first noise generator is positioned to affect light propagating in said interrogating arm of the one interferometer loop and in both interrogating and reference arm of the other interferometer loop, thereby affecting coherence relation between the reference and interrogating arms of the other interferometer loop.

According to some embodiments, the system may further comprise an additional noise generator positioned in path of beam in said other interferometer loop, said additional noise generator is configured to apply noise correlated with noise of said first noise generator.

According to some embodiments, the at least first and second detectors may be balanced detectors with respect to output of the first and second interferometer loops.

According to some embodiments, the at least first and second detectors may be RMS detectors configured for generating output signal indicative of power of the interfering signals within a selected frequency range.

According to some embodiments, the first and second detectors may be configured for generating corresponding detection sequences at selected sampling frequencies, a ratio between amplitude at peak signal frequency being indicative of a distance to said target object.

According to some embodiments, the light source unit may comprise a coherent light source and a second noise generator, said second noise generator is configured to affect coherence length of output light from said coherent light source. The coherent light source may be a laser system operating in CW or pulse mode.

According to some embodiments, the system may further comprise a phase modulator positioned in path of beam directed toward or collected from the target element, said phase modulator being configured to apply varying phase modulation in collected light at selected frequency, thereby enabling detection of coherence term of interference signal.

According to some embodiments, the system may further comprise at least one phase modulator positioned in paths of beam directed toward reference arms of said first and second interferometer loops, for modulating phase of the respective reference beams at selected modulation frequencies, thereby shifting beating frequencies of the collected interfering signals.

The phase modulators of the first and second interferometer loops may operate at first and second different modulation frequencies, generating respective first and second different beating frequencies for signals of the first and second interferometer loops.

The phase modulators may operate for varying phase in a selected sequence. It should be noted that a relation between sampling rate of the detector and rate of phase variation of the phase modulator determines the selected frequency.

According to some embodiments the system may further comprise a control circuit configured and operable to receive detected signals from said detection unit, said detected signal being associated with coherence terms for beams in said first and second interferometer loops.

According to some embodiments the control circuit may be configured and operable to determine a relation Γ (Gamma) between mutual coherence factors detected by said detection unit for said at least first and second interferometer loops, said relation Γ being indicative of a range to said target object.

According to some embodiments the control circuit may be configured and operable to utilize data on effective coherence length for said at least first and second interferometer loops to determine range to said target object.

According to some embodiments the control circuit may be configured for analyzing variation frequency of the detected signals from said detection unit, said analyzing comprising determining peak frequency of variation of the detected signals and power of peak frequency components, a relation between power of peak frequency components of signals of the at least first and second interferometer loops being indicative of range to said target object According to some embodiments the detection unit may comprise at least first and second detector arrays, said optical arrangement comprises imaging optical arrangement for generating an interference of image of said target object and respective first and second reference beams onto said first and second detector arrays, to thereby generate interference data of said image on the corresponding one of the first and second first and second detector arrays respectively, thereby enabling range detection of a selected field of view.

According to some embodiments the optical arrangement may be configured for transmitting said light propagating in said interrogating arm toward a selected field of view comprising at least one of said target object According to some embodiments the system may further comprise a scanning unit configured for varying direction of said interrogating beam, thereby enabling scanning of a field comprising said target object. The scanning unit may comprise one or more of optical phased array unit, beam steering unit, diffractive element, scanning mirror and/or MEMs scanner.

According to some embodiments the optical arrangement may comprise at least one optical fiber section. The reference arm of said first and second interferometer loops may be formed by optical fiber.

According to some embodiments the optical arrangement may comprise at least one free-space propagation section associated with at least one of said first and second reference arms.

According to some embodiments the system may comprise at least a portion of said system configured as a system on chip.

The system may be configured as a whole system on a chip.

According to some embodiments the at least first and second interferometer loops may comprise at least additional third interferometer loop, thereby enhancing accuracy of range detection.

According to some embodiments the system may further comprise a coherence length/linewidth measurement unit positioned at output of said one or more light sources, said coherence length measurement unit is configured to periodically or continuously determine/measure coherence level of emitted beam, to thereby generate data oh initial coherence length of emitted beam for calibration of range detection by the system.

According to one other broad aspect, the present invention provides a system comprising:

at least one light source unit configured to provide optical illumination having certain coherence length;

and optical arrangement comprising at least one splitting unit, said splitting unit being configured for directing said optical illumination to form at least one reference beam and at least one interrogating beam, and for directing said at least one interrogating beam toward a target;

a light collection unit configured for collecting light of said at least one interrogating beam reflected from said target, and direct collected light to a detection unit;

a detection unit comprising at least two detectors, each configured for detecting combined illumination formed by at least a portion of a reference beam and a portion of collected light and generate detection data, said detection data being indicative of a distance to said target; and wherein said at least one reference beam comprise at least two reference beams; and wherein the system comprises a noise generating unit configured to affect coherence length of light in one of the reference arms with respect to the other.

The system may be further configured as indicated above.

According to yet another broad aspect, the present invention provides a system comprising:

at least one light source unit configured to provide optical illumination having certain coherence length;

and optical arrangement comprising at least one splitting unit, said splitting unit being configured for directing said optical illumination to form at least one reference beam and at least one interrogating beam, and for directing said at least one interrogating beam toward a target;

a light collection unit configured for collecting light of said at least one interrogating beam reflected from said target, and direct collected light to a detection unit;

a detection unit comprising at least two detectors, each configured for detecting combined illumination formed by at least a portion of a reference beam and a portion of collected light and generate detection data, said detection data being indicative of a distance to said target; and wherein said at least one interrogating beam comprise at least two interrogating beams different between them in wavelength; and wherein the system comprises a noise generating unit configured to affect coherence length of light in one of said at least two interrogating beams the interrogating beams.

According to a further broad aspect, the present invention provides a system comprising a light source unit configured for providing optical illumination having certain coherence length, an optical arrangement configured for directing one or more interrogating beams toward a target object and a collection unit configured for collecting at least a portion of light reflected from said target object, and a detection unit comprising at least first and second detectors; said optical arrangement comprises a beam splitting unit configured for splitting light from said light source unit to form said one or more interrogating beam and at least first and second reference signals; said collection unit comprises a light splitting unit configured to split said collecting light to at least first and second portions; said at least first detectors is positioned and configured for combined detection of interference light of said first reference signal and first portion of the collected light, and said second detector is positioned and configured for combined detection of interference light of said second reference arm and second portion of the collected light; wherein said optical arrangement comprises at least one noise generator configured to apply selected random variation to said one or more interrogating beam and said second reference arm, thereby generating a difference in coherence properties between said first and second reference arms with respect to the collected light, said detector unit thereby provides output detection data indicative of range to said target object.

According to yet another broad aspect, the present invention provides a method for use in determining range to a target object, the method comprising:

providing electromagnetic (EM) beam portions propagation in at least first and second interferometer loops, each interferometer loops comprising at least reference arm and interrogating arm, said interrogating arm being configured to direct a portion of said EM beam toward a target object and collected reflected EM beam; said at least first and second interferometer loops thereby provide measurable data on interference between reference beam and interrogating beams reflected from said target object; wherein EM beam portions of said at least first and second interferometer loops being characterized in at least first and second different coherence lengths;

processing said measurable data on interference obtained from said first and second interferometer loops and determining range to said target object.

According to yet further broad aspect, the present invention provides a method for use in determining range to a target object, the method comprising:

a. providing electromagnetic (EM) beam of certain coherence length;

b. directing at least first and second portions of the EM beam toward first and second reference arms c. directing at least a third portion of the EM beam toward said target object;

d. collecting reflected radiation comprising EM beam components reflected from said target object, and directing first and second portions of the reflected radiation to interfere with EM beams of said first and second reference arms, and determining first and second interference intensities associated with interference of said first and second portions of reflected light with light of said first and second reference arms respectively; and e. processing data on said first and second interference intensities to determine range to said target object;

wherein the method comprising applying selected noise affecting relative coherence between at least one of said first and second portions of illumination and said third portion of the EM beam.

The data on first and second interference intensities may be associated with interference levels of the first and second portions of the EM beam and may be associated with the selected noise affecting coherence of at least one of said first and second portions of illumination and said third portion of the EM beam.

According to some embodiments, said processing comprises determining constant and mutual coherence portions of said first and second interference intensities and determining a ratio between mutual coherence factor of said first and second interference intensities.

According to some embodiments, said processing comprises providing data on coherence lengths of light portions in said first and second reference arms and utilizing a relative difference in the coherence lengths or levels for determine range to said target object.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which.

DETAILED DESCRIPTION OF EMBODIMENTS

Figure 1:
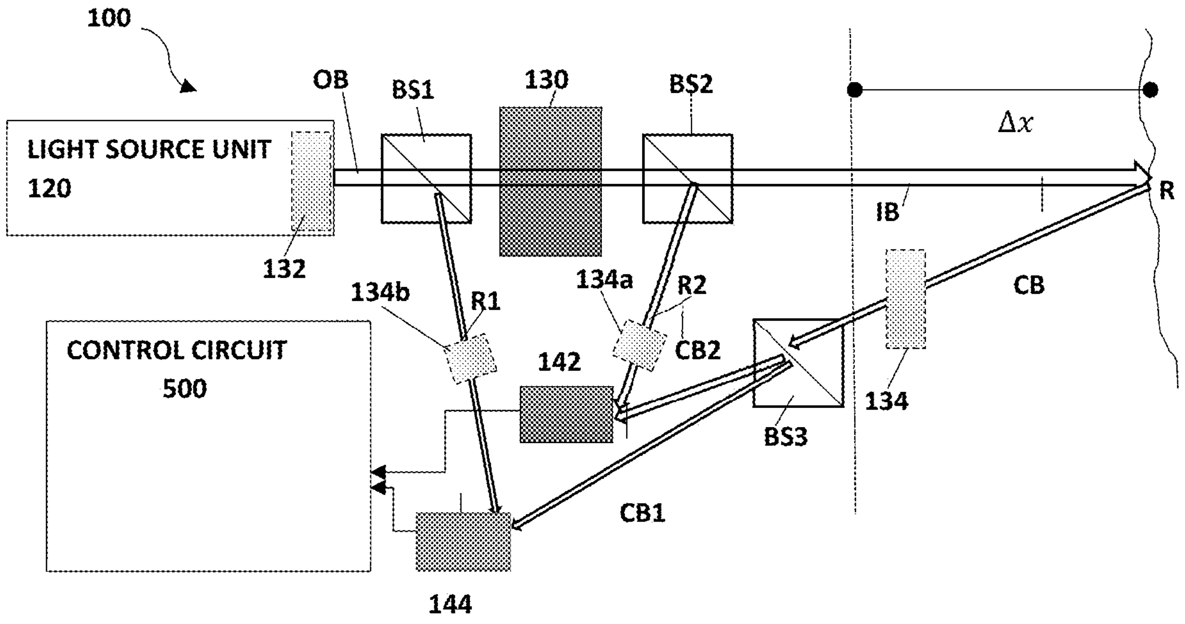
FIG. 1 schematically illustrates a system for range and distance detection according to some embodiments of the present invention.

As indicated above, the present invention utilizes detection of at least first and second interference intensities and determining a relation between the interference intensities for determining a distance of one or more target objects. Reference is made to FIG. 1 schematically illustrating a system 100 for range detection according to some embodiments of the present invention.

The invention provides for optical range detection based on interference of at least partially coherent illumination having certain, typically finite, coherence length. The technique utilizes output illumination having certain coherence length. The output illumination is split to form at least first and second reference beams and at least one interrogating beam, or to at least first and second interrogating beams and at least one reference beam. Additionally, the optical arrangement includes at least one noise generator unit 130 configured to apply selected noise pattern to beam portions to thereby vary coherence length of the beam portion. This generally enables providing coherence length variation between the first and second reference beams.

FIG. 1 illustrates system 100 including a light source unit 120, configured to provide electromagnetic radiation OB (generally optical, but RF, Infrared, microwave, or ultraviolet radiation may also be used with proper modification clear to a person skilled in the art) of selected wavelength range and coherence length. EM radiation OB is split by splitters BS1 and BS2 to propagate in at least first and second interferometer loops including reference beams R1 and R2 and output interrogating beam IB. The interrogating beam IB is directed by transmitting optical arrangement (not shown) toward a target object R located at unknown distance Δx and reflected portions of the beam CB are collected by collecting optical arrangement into the system 100. The collected beam CB is split by splitter BS3 to two or more portions CB1 and CB2, directed to mix/interfere with reference beams R1 and R2 respectively. The interference intensities of the reference beams R1 and R2 with the respective portions of collected beams CB1 and CB2, are collected by detector elements 144 and 142 to provide respective detected electric signals. Additional beam splitter/combiners may generally be used to align collected beams CB1 and CB2 with the respective reference beams R1 and R2.

This configuration provides first and second interferometer loops, where a first loop includes reference beam R1, interrogating beam IB and collected beam CB1, where interference signal of reference beam R1 and collected beam CB1 is detected by detector 144; and a second loop includes reference beam R2, interrogating beam IB and collected beam CB2, where interference signal of reference beam R2 and collected beam CB2 is detected by detector 142.

Detector elements 142 and 144 may be single pixel detectors (e.g., photodiodes), or detector arrays as described further below. Additionally, detectors 142 and 144 may be configured as RMS detectors or balanced detectors, operable to provide output data indicative of coherence of the interfering signals or be operable for collecting a sequence of detection instances in a selected sampling rate, allowing further processing of the collected signals to determine coherence of the interfering signals. For example, coherence level of the interfering signals may be determined in accordance with phase fluctuations in the interference signal reducing energy in peak frequency of signal, or contrast variations of the interfering signal.

A first noise generator 130 is positioned in path of the EM beam downstream of splitter BS1. In some embodiments, an additional second noise generator 132 may be positioned in path of EM beam emitted from source 120, applying initial reduction in coherence length of emitted radiation and enable selective variation of initial coherence length of output light. Generally, second noise generator 132 may be associated with source 120. The first noise generator 130 (and second noise generator 132 when used) may be random phase modulator, phase noise generator, or other noise generating unit. The first noise generator 130 is configured to apply selected noise pattern that may be selected from predetermined noise patterns, random noise pattern or pseudo-random noise pattern, that affects the EM beam passing therethrough. Location of the first noise generator 130, downstream of splitter BS1 provides that the applied noise varies/reduces coherence length of EM radiation propagating in the second interferometer loop, with respect to the beam propagating in the first interferometer loop. More specifically, the first noise generator 130 is positioned to affect both reference and interrogating arms of the second interferometer loop, accordingly it effectively reduces coherence length of EM beam propagating in the second loop, compared to coherence length of the EM beam in the first loop. Following path of the EM beam in the first interferometer loop, the first noise generator 130 affects interrogating beam part of the first interferometer loop, causing phase variation in the detected signal without affecting coherence length of the beam propagating in the first interferometer loop.

One or more of the noise generators 130 and 132 may include, or be associated with, a linewidth measurement unit (not specifically shown). The linewidth measurement unit may be configured for monitoring linewidth/bandwidth of beam output from the noise generator and generate data indicative thereof. The linewidth data may be transmitted to the control circuit to provide input data indicative of coherence length lc1 and/or lc2 for the first and second interferometer loops. The coherence length data is typically stored in the control circuit for determining coherence variation parameter K as described further below.

In some embodiments, an additional noise generator (not specifically shown) may be positioned along the path of the R1 or CB1 beams. The additional noise generator may be configured to provide correlated noise pattern in accordance with first noise generator 130. This enables to compensate for phase variations associated with noise affecting the interrogating beam IB.

An additional phase modulator 134 may be placed in path of interrogating beam, i.e., affecting output beam IB or collected beam CB. The phase modulator 134 generally operates to periodically shift phase of the interrogating beam within a selected phase range and/or selected frequency (e.g., applying phase modulation in a range of 2π), to thereby oscillate phase difference φ of the detected interfering signals, collected by detectors 144 and 142 by the factor of cos(φ). Generally, phase modulator 134 may be operated to generate a frequency shift on the collected beam CB (or on output beam IB) relative to the reference, thus shifting frequency of the interfering signal from DC (zero frequency) to a selected modulation frequency. This is important for avoiding any phase ambiguity and/or for shifting the measured signal to a desired frequency and further enabling detection of Doppler shift due to target closing speed.

Thus, phase modulator 134 enables to remove signal variation associated with phase miss-match φ between reference beam and interrogating beam and enable detection of contrast between maximal constructive interference and destructive interfering signals. As indicated in equation 1, the contrast is associated with coherence term between the interrogating and reference beams. For example, phase modulator 134 may operate to modulate phase of the beam by 0-2π (or by −π to π) range, to enable detection of contrast between interfering minima and maxima. It should be noted that phase modulator 134 may be positioned at output of interrogating beam IB, input of collected beam CB as exemplified in FIG. 1 and may also be placed in any place along path of one of the interrogating and collected beams. Alternatively, phase modulator 134 may be positioned to affect both reference beams R1 and R2. In case of phase modulator 134 positioned along reference beams R1 and R2, two phase modulators 134*a* and 134*b* may be used, modulating the reference beams R1 and R2 at different frequencies. This may enable the use of single detector unit, where first and second interfering signals are determined based on first and second peak frequencies.

Accordingly, with the assumption of Lorentzian beams, intensity of EM beams collected at the first and second detectors 144 and 142 can be expressed by $$I_1 = \left[I_{R1} + \eta_{S1} I_{1B} + 2 \cdot \sqrt{I_{R1}\eta_{S1}I_{1B}} \cdot \cos(\varphi_1) \cdot e^{-\frac{r-L_1}{lc1}}\right] \quad \text{(Equation 2)}$$

$$I_2 = \left[I_{R2} + \eta_{S2} I_{1B} + 2 \cdot \sqrt{I_{R2}\eta_{S2}I_{1B}} \cdot \cos(\varphi_2) \cdot e^{-\frac{r-L_2}{lc2}}\right]$$

Where $I_{R1}$, $I_{R2}$, $I_{1B}$ are intensities of first and second reference beams and the interrogating beam respectively, $\eta_{S1}$ and $\eta_{S2}$ are effective collection efficiency for the first and second portions of the collected beams, generally associated with reflectance of the target and numerical aperture of the collection optics. $L_1$ and $L_2$ are respective effective lengths for the first and second interferometer loops, determined by difference between reference arm length and fixed length of interrogating and collection paths. While the distance to the target object is Δx, the interrogating and collected beam has a typically longer path as it goes to the target and back and may have certain path within the system. Accordingly, the beam path length may be r=2Δx−Δr where Δr is the different between the length of the reference arm within the system prior to splitting of the interrogating arm. Generally, utilizing proper splitting elements BS1, BS2 and BS3, the respective intensities along the reference arms $I_{R1}$, $I_{R2}$ may have known relations, and are assumed to be equal for simplicity. Similarly, the effective collection efficiencies $\eta_{S1}$ and $\eta_{S2}$ may have known relation and are assumed to be equal for simplicity.

The constant terms that are not dependent on range Δx may be determined separately or removed using suitable detection scheme. For example, the oscillating term $\cos(\varphi_1)$ can be removed using the phase modulator 134. Power/intensity of the reference and interrogating beams may be removed based on pre-stored data or utilizing balanced detector arrangement as exemplified below. Accordingly, the coherence terms C1 and C2 for the first and second interferometer loops are determined providing data on distance (range) to the target object.

$$C1 = \sqrt{I_{R1}\eta_{S1}I_{1B}} \cdot e^{-\frac{r}{lc1}} \quad \text{(Equation 3)}$$

-continued $$C2 = \sqrt{I_{R2}\eta_{S2}I_{1B}} \cdot e^{-\frac{r}{lc2}}$$

Assuming similar effective lengths $L_1$ and $L_2$, and collection efficiency $\eta_{S1}=\eta_{S2}=\eta$. Eliminating the DC terms and dividing the signal from the detectors provides:

$$\frac{C2}{C1} = \Gamma = e^{-\Delta x\left(\frac{1}{lc2} - \frac{1}{lc2}\right)} = e^{-\Delta x K} \quad \text{(Equation 4)}$$

Also referred herein as Gamma factor. Utilizing pre-known data on coherence lengths lc1 and lc2, the coherence variation parameter $$K = \left(\frac{1}{lc2} - \frac{1}{lc2}\right)$$

can be determined and stored (e.g., at a memory unit). For the general case, coherence variation parameter K may also be dependent on difference in path between the first and second interferometer loops.

This enables to determine the gamma factor and accordingly to determine the range to a target Δx by:

$$\Delta x = -A\frac{\ln(\Gamma)}{K} + B \quad \text{(Equation 5)}$$

where A and B are calibration parameters associated with internal paths of the beams within the system and their relative intensities.

It should be noted that in case of beams having spectrum other than Lorentzian, the above defined Gamma factor (Γ) may be formulated as other functions of the coherence terms C1 and C2. This may be due to exponential quadratic (for Gaussian beam) or other dependency of the coherence term in distance.

As indicated above, coherence length lc1 and lc2 are associated with pattern of noise/phase variations applied by noise generators 130 and 132. Further, the natural lengths $L_1$ and $L_2$ associated with the first and second interferometer loops may be equal or not, while the difference between the interferometer loops is based on the coherence lengths thereof. Generally, difference in length $L_1$ and $L_2$ may be handled by calibration and determining coherence variation parameter K to include a difference factor. Accordingly, utilizing pre-stored data on relative transmission/reflection coefficients and emission intensity, lengths of the interferometer loops, and data on effective coherence lengths for the first and second interferometer loops, enable determining Δx being a distance/range from the system to object R.

It should be understood that the present technique is described herein using certain assumptions for simplicity, and may be operated with different configurations, for example, the technique is generally described herein using equal intensities of reference beams R1 and R2, or first and second signal beams CB1 and CB2. It should be understood that this is a design preference and variation in power between the first and second interferometer loops may render functional or constant variation of the pre-stored coherence variation parameter K, and/or in determining of the range based on detected intensities. Such variations may be associated with calibration data stored and used by the control circuit 500.

It should also be noted that the present technique may utilize detection of frequency (temporal changes) variations of the detected signals. Using detection unit (142 and 144) having bandwidth that is faster with respect to linewidth of the light source 120, interference signal variations are detected, however frequency of the interference signal varies in accordance with the coherence term described above. Accordingly, the Gamma factor can be determined based on relative amplitude of peak frequency of the first and second detected signals, rather than the average (integrated) intensity.

Accordingly, the system 100 may include a control circuit 500, connectable to at least the first and second detectors 144 and 142 for receiving data on detected intensities and configured for processing the received intensity data and determining accordingly data on range between the system and one or more target objects. The control circuit may also be connectable to the light source unit 120, and to the one or more noise generators 130, 132 and phase modulator 134 for providing operational instructions determining operation of the system, such as selected noise pattern and phase modulation frequency.

The control circuit 500 may utilize at least one processor and memory unit, operatively connectable to a hardware based I/O interface including communication with the above indicated elements of the system and user interface. The control circuit may thus include one or more processors and memory unit. The memory unit may include pre-stored data on operation of the system and computer readable instructions that when executed by the processor cause the processor to operate for determining range to one or more target objects as described herein.

As indicated above, the processor unit of the control circuit may be operable for receiving data from the first and second detector units 142 and 144, and for each detector unit, to determine data indicative of contrast between maximal and minimal collected signals, also referred herein as coherence terms. The processor is further configured for determining a relation between the first and second coherence terms and determining accordingly a range to the object.

Generally, for each of the interferometer loops, maximum amplitude is achieved for range Δx being equal to effective length of the reference path. More specifically, in cases where the interrogating beam, in its path within the system and to the target object and back, propagate a similar distance as the respective reference beam. Further, for variations in path between the interrogating beam and reference beam, the coherence terms reduce due to relative decoherence of the beams. As the coherence lengths of beams in the first and second interferometer loops are different, the rate of decoherence varies between the first and second interferometer loops, providing two (or more) separate signals, associated with target distance. This enables to compensate for possible unknowns such as the effective collection and the reflectivity of the target R.

In some configurations, the system 100 may be operable using single reference beam and first and second interrogating beams. Such configurations may be in mirror reflection of FIG. 1, where a first interrogating beam is directed at the target object upstream of first noise generator 130, and second interrogating beam is directed at the target object downstream of the noise generator 130. The first and second interrogating beams may be temporally or spectrally separated, time multiplexed between them, and/or modulated in different beating frequencies (e.g., by phase modulators 134*a* and 134*b* mentioned above) enabling to distinguish between them to determine first and second interfering signals by detector units. In some additional configurations, the system may utilize first, and second separate interferometer loops associated with first and second different wavelengths (enabling to distinguish between interrogating beams, and first and second different coherence lengths.

Figure 2:
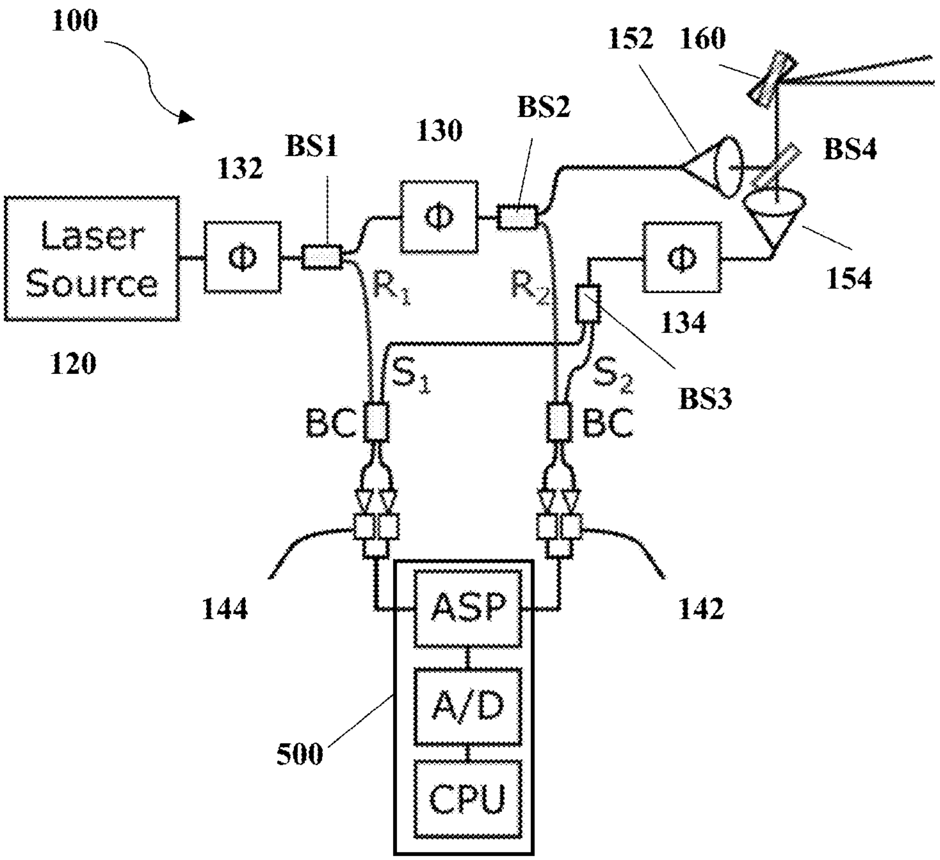
FIG. 2 illustrates a system for range and distance detection implements in fiber configuration according to some embodiments of the present invention.

Reference is made to FIG. 2 exemplifying configuration of a range detection system 100 according to some embodiments. System 100 includes a laser light source 120, first beam splitter BS1 directing a portion of light toward reference path R1 and a portion of light toward a first noise generator 130, second beam splitter BS2 directing a portion of light toward reference path R2 and a portion of light to interrogating beam. The interrogating beam is transmitted via transmitting optics 152 toward a target, and light reflected from the target is collected by collecting optics 154. In this example, the outcoupling optics also includes a scanning mirror 160 enabling scanning of a selected region to determine ranges to various objects in a field, and beam splitter BS4 configured to direct outgoing beam toward the scanner 160 and collected beams toward the collecting optics 154. Additionally, or alternatively, as indicated further below, the interrogating and collected beams may be directed via common lens optical elements (e.g., collimating lens), and using a circulator or beam splitter such as BS4 for directing the collected beam within the system.

Generally, scanner 160 may utilize any scanning mechanism such as MEMS mirror, galvanometric mirror, or rotating wheel. Scanner 160 is associated with a control circuit providing scanning of a selected field of view in selected scanning rate. Additionally, or alternatively, the scanner 160 may be formed by OPA (Optical Phased Array), enabling beam steering of interrogating beam IB. Further additionally or alternatively, the scanner 160 may utilize controllable Grating, Prism, or other diffractive/refractive elements enabling to selectively direct interrogating beam toward and selected direction and collect reflected beam from the corresponding direction. The scanner 160 may be connectable to the control circuit 500 configured to synchronize scanning operation with frame rate of detector units 144 and 142, to provide data indicative of angular direction associated with the different detection instances.

The collected beam is typically transmitted through a collection phase modulator 134 configured to apply selected frequency shift to phase of the collected beam, to enable extraction of coherence level of the interfering signal. For example, the coherence level may be determined by peak amplitude in frequency domain or by contrast of the signal between minima and maxima and is generally associated with coherence term of the interference between the reference and collected beams. The phase modulator 134 may generally operate at a selected frequency, shifting frequency of the collected interfering signal. The collected beam is further split by collection beam splitter BS3 to first and second collected light portions S1 and S2 being first and second signal beams. As described above, the present technique utilizes interference between the first and second portions of collected light S1 and S2 and the respective first and second reference beams R1 and R2. To this end, the reference and collected beams are coupled in respective beam combiners BC and directed to respective first and second detectors 144 and 142. In this example, the system utilizes balanced detectors, for example, the balanced detectors may be configured for pair of photodetectors connected together to provide balanced detection scheme, e.g., connected to cancel DC terms and common noise, providing improved signal to noise ratio. As indicated above, phase modulator 134 may be positioned in path of output interrogating beam, collected beam, or paths of reference beams.

Detection data, from the first and second detectors 144 and 142 is transmitted to control circuit 500. In this example, the control circuit includes an analog signal processor ASP, analog to digital converter A/D and one or more processors CPU. As indicated above, the control circuit 500 may also include memory unit, and at least one of user interface or communication port.

Figure 3A:
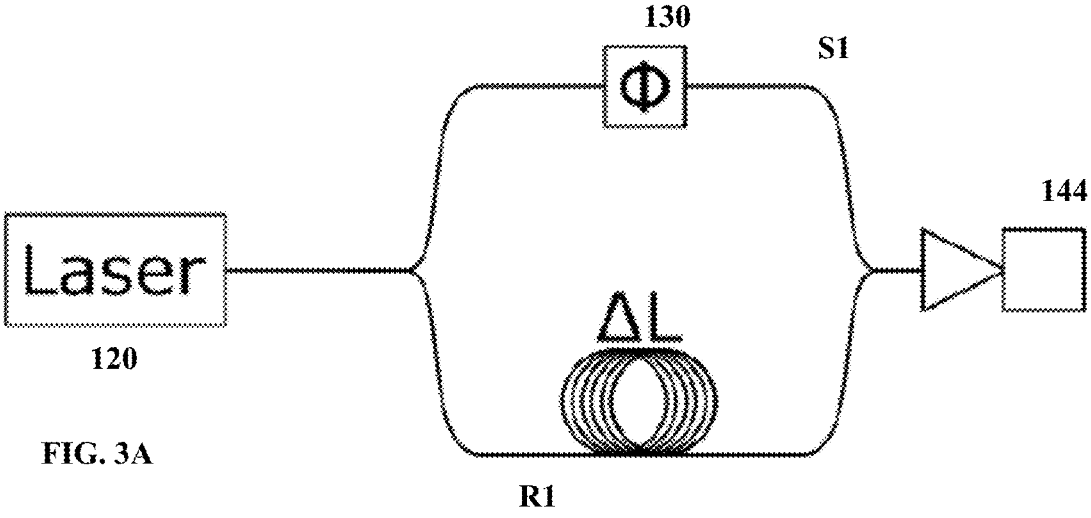
FIGS. 3A and 3B exemplify effect of location of noise generator according to some embodiments of the present invention.
Figure 3B:
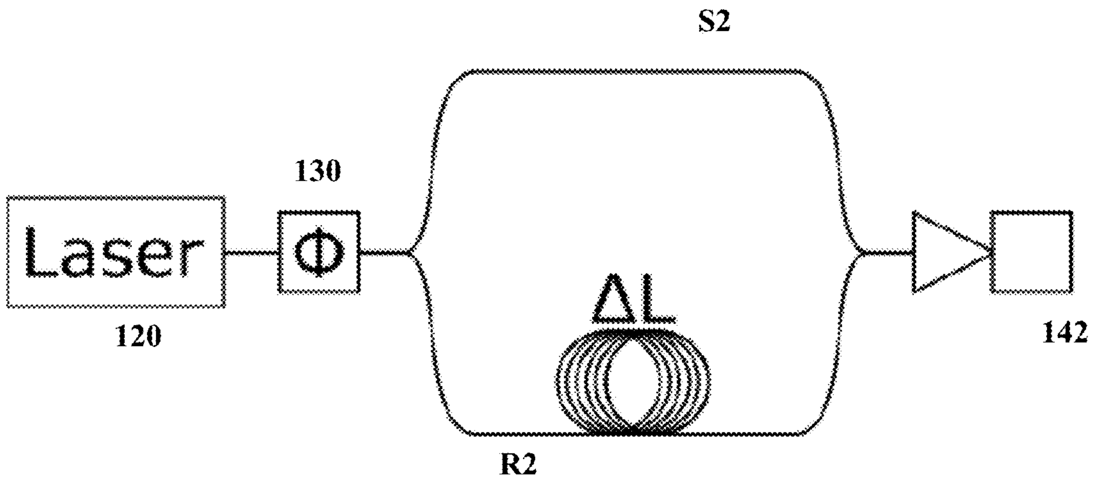

Configuration and signal path of system 100 provides effective first and second interferometer loops. A first interferometer loop is formed by first reference beam R1, interrogating beam and first signal beam S1. In this loop, only the interrogating part passes through the first noise generator 130, while the reference beam R1 is not affected by the noise generator. The second interferometer beam is formed by second reference beam R2, interrogating beam and second signal beam S2. In the second interferometer loop, both the reference and interrogating beams are affected by first noise generator 130. The main difference between the first and second interferometer loops is the location of the first noise generator 130. These interferometer loops are schematically exemplified in FIGS. 3A and 3B. In FIG. 3A noise is applied only on the interrogating part of the beam, while the reference beam is unaffected. This shifts the relative phase between the two beams. However, as the present technique utilizes contrast of interference, the coherence term is not affected by the phase change in this interferometer. In the example of FIG. 3B, noise is applied before split to interrogating and reference beams. The noise pattern thus reduces coherence of the beam as the optical path length of the reference beam and the interrogating beam become larger.

Accordingly, the present technique utilizes variation of coherence length between beams propagating in at least first and second interferometer loops to determine a range to one or more target objects. The present technique thus need not any variation in delay lines, or in path/length, or in wavelength of the interferometer loops. This enables simplified range detector system construction, which for example may be formed as photonic chip/circuit having relatively simple hardware requirements and form factor.

Further, the present technique provides time agnostic measurement as compared to conventional techniques that utilize time of flight or Frequency Modulated Continuous Wave measurement techniques. The present technique utilizes coherence length and decreasing of coherence between beam portions with respect to path variation of the beam portions. This enables the system of the present technique to utilize simple and robust constructions, that does not require expensive and fast detection sensors as typically required in TOF and FMCW techniques.

The present technique may be operable with selected coherence lengths lc1 and lc2, thus enabling selectively tunable dynamic range. Selected noise patterns may be pre-stored in the control circuit for operation of noise generators 130 and 132 for selectively tunning/reducing coherence length of beam propagating in the first and/or second interferometer loops. Utilizing variation in coherence length, by proper selection of noise patterns enables selective variation in dynamic range. More specifically, when measuring relatively large range, the coherence length may be selected to be relatively longer as compared to smaller ranges.

Figure 4:
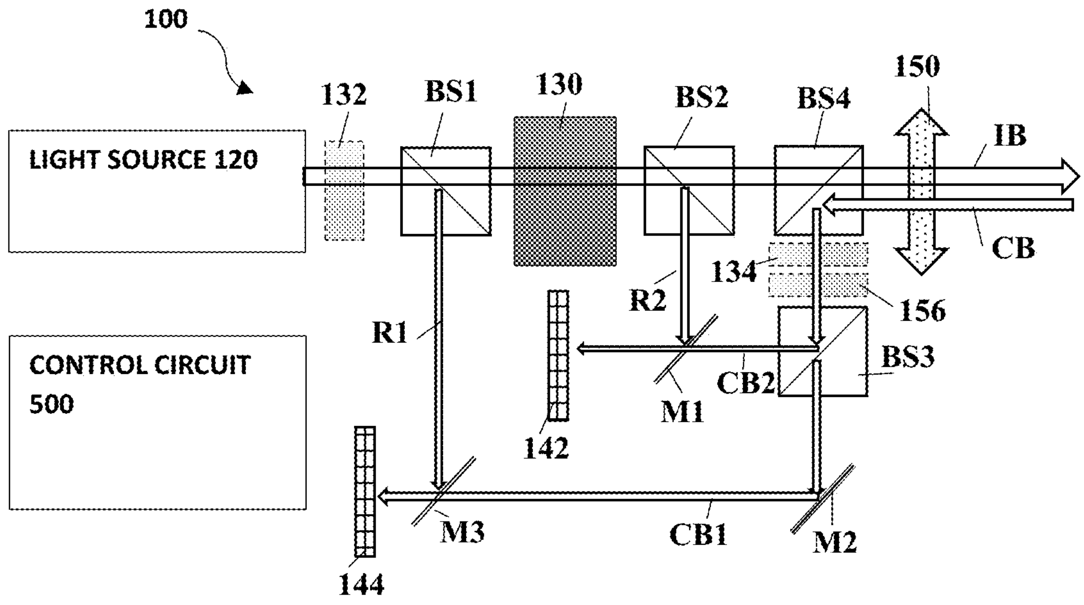
FIG. 4 illustrates a system for distance detection from a field of view according to some embodiments of the present invention.

As indicated above, the present technique may utilize scanner 160 for determining range of a plurality of points within a scene. Additionally, as indicated above, the present technique enables determining range for various positions in a scene, typically in accordance with geometrical resolution of image collection. This is exemplified in FIG. 4 illustrating system 100 for obtaining range data from a field of view according to some embodiments of the present technique. As shown, system 100 includes a light source unit 120, configured to provide EM radiation (e.g., visible light, IR, microwave, UV, etc.) having selected bandwidth and coherence length. Typically, light source unit 120 may utilize one or more laser units. In such configurations, the system may include initial noise generator 132 (e.g., phase modulator) positioned in path of emitted beam and configured to apply selected noise pattern to emitted beam to thereby selectively reduce/control and stabilize coherence length thereof.

The emitted radiation is split, e.g., using first beam splitter BS1, to direct a selected portion of the beam to first reference beam R1, downstream of the splitting, the beam is passed through a first noise generator 130 (e.g., phase modulator) configured to apply selected noise or phase modulation pattern on the beam. Further, downstream of the noise generator 130, a second reference beam R2 is split, e.g., using beam splitter BS2. An interrogating beam IB is directed, generally using optical arrangement 150, toward a scene to provide field illumination of a selected field of view. Optical arrangement 150 generally includes one or more lenses, apertures, or other optical elements for directing emitted beam to illuminate a selected field of view and may also be used for collecting light CB reflected from the field of view.

Light returning from the field of view is collected using optical arrangement 150 or using parallel optical arrangement that is not specifically shown here. The collected light CB is diverted to collection path using beam deflector or beam splitter or polarizing beam splitter BS4. The collected light may be filtered by wavelength or polarization or both filter 156 and may be transmitted through phase modulator 134 configured to apply shift to beating frequency of the interfering signal. In some configurations, the phase modulator may vary phase of the beam within a selected range (e.g., between 0-2π) at a selected frequency to enable direct detection of coherence level of the interfering signals. The collected beam CB is further split, e.g., by beam splitter BS3, to first and second signal beams CB1 and CB2, directed to mix/interfere with respective first and second reference beams R1 and R2. In this example, the signal beams CB1 and CB2 are directed using mirror M1, M2, and M3 to selected path and to interfere with the reference beams. Accordingly, mirrors M1 and M3 are generally partly reflective and partly transmissive. It should be noted that combining the reference and collected beams may be done in various techniques as known in the art. Accordingly mirrors M1 and M3 may be replaced by other configurations of the optical system. The interfered signals, associated with first signal beam CB1 and first reference beam R1, and associated with second signal beam CB2 and second reference beam R2, are directed respectively to first and second detector arrays 144 and 142. The detector arrays 144 and 142 are positioned in image plane with respect to the scene using optical arrangement 150. It should be noted that system 100 may include one or more additional optical elements that are not specifically shown here, positioned to relay image plane to selected location of the detector arrays 144 and 142, and to apply selected optical power on reference beams R1 and R2 to provide interference data for selected plurality of pixels, preferably covering the field of view of system 100. It should also be noted that detector arrays 144 and 142 may be formed as balanced detector arrays.

Detector arrays 144 and 142, may be two dimensional arrays providing image representation of the field of view. Alternatively, detector arrays 144 and 142 may be one-dimensional 1D array. In such configurations, the system may be configured to provide line range data indicative of range of objects within a one-dimensional line. This 1D configuration may also include a scanner unit (exemplified as scanner 160 in FIG. 2) configured to provide scanning in perpendicular axis with respect to the 1D detector arrays, thereby providing actual 2D image data in hybrid form between detector array and scanning of the field of view.

Detector arrays 144 and 142 are configured to transmit data on detected optical coherence level maps to the control circuit 500. As indicated above, control circuit 500 may include one or more processors and memory unit, configured for determining range to objects for at least one, at least a selected group, or preferably each pixel of the detector arrays 144 and 142, in accordance with relation between detected intensity in the respective detector cells. The control circuit may utilize pre-stored data (e.g., calibration data) indicative of coherence variation parameter K. Specifically, the pre-stored data may include data on coherence lengths lc1 and lc2, intensity variations between reference beams and signal beams, and selected noise patterns applied by the noise generators 130 and 132.

The control circuit 500, is thus configured and operable for processing image coherence level map generated by the first and second detector arrays 144 and 142, and determine accordingly data on a range map, indicative of range to selected one or more positioned within the field of view. The control circuit is thus configured to provide output data indicative of range map to an operator, transmit the range map using communication module to a remote system or store it in a memory unit thereof. Thus, the present technique, utilizing scanning arrangement as exemplified in FIG. 2, or field illumination exemplified in FIG. 4, enables generating three-dimensional (3D) map of a selected field of view. Such 3D map provides an image (generally monochromatic) of the field of view including data on range to the different elements in the field of view.

The present technique may operate using various wave signals including electromagnetic radiation and acoustic waves. In the case of electromagnetic radiation, the present technique may utilize optical radiation, or IR radiation. Additionally, the present technique may operate in microwave and RF radiation frequencies, where mixing of the reference and collected beams can be performed electronically after collection of the respective beams using corresponding antenna elements. Further, in microwave and/or RF frequencies, the present technique may utilize phase array antenna units, enabling steering of emitted beams and determining collection beams to provide spatial separation between different regions of a field of view.

The range detection system of the present technique as described above may be implemented as on chip system utilizing selected waveguides (e.g., Silicon, SiN, InP, or any other Photonics Integrated Circuits technology selected in accordance with wavelength of beam used). The system may also be implemented in fiber-based system as generally exemplified in FIG. 2 and/or using free-space propagation as exemplified in FIGS. 1 and 4. Further, the range detection system may utilize a combination of one or more of photonic circuit, optical fibers and/or free-space propagation.

It should also be noted that the present technique is described herein above using first and second interferometer loops, or first and second reference beams. However, it should be understood that the selected number of interferometer loops or reference beams may be increased, using an arrangement of three, four or more interferometer arrangements, associated with corresponding different coherence lengths. This may be used to provide additional measurement data and enable increase of signal to noise ratio and robustness of range detection. Further, it should be understood that the different interferometer loops may utilize two or more different wavelength ranges, thereby also utilizing two or more separate interrogating beams.

Thus, the present technique provides for range detection relating to distance to one or more target objects in the field. The present technique utilizes coherence length variation and interference between interrogating and reference beams for determining time-agnostic data indicative of distance to one or more target objects as described above.

The invention claimed is:

1. An optical system comprising one or more light sources providing coherent illumination of a selected wavelength range, an optical arrangement, and a detection unit;

said optical arrangement comprises optical elements forming at least first and second interferometer loops, each comprising a reference arm and an interrogating arm, said at least first and second interferometer loops being associated with corresponding at least first and second detectors of the detection unit; light propagating in said interrogating arm is directed at a target object via an output optical element and a reflection of light from said target object is collected by an input optical element;

said detection unit comprise the at least first and second detectors configured for detection of interfering signals of the respective one of the first and second interferometer loops, said detection unit is configured to determine data indicative of a relation between signals detected by the at least first and second detectors;

wherein one of said first and second interferometer loops comprises a first noise generator positioned to affect light propagating in both of the corresponding reference and interrogating arms, thereby affecting coherence of light in said interferometer loops; and wherein a ratio between measured signals of the at least first and second interferometer loops is indicative of range to said target object.

2. The system of claim 1, wherein said at least first and second detectors are configured for providing output signal indicative of coherence term between respective beam components of the reference and interrogating arms.

3. The system of claim 1, wherein said interrogating arm is at least partially common between said first and second interferometer loops, and wherein said first noise generator is positioned to affect light propagating in said interrogating arm of the first interferometer loop and in both the interrogating and reference arms of the second interferometer loop, thereby affecting coherence relation between the reference and interrogating arms of the other interferometer loop.

4. The system of claim 1, further comprising at least one phase modulator positioned in paths of the beams directed toward reference arms of said first and second interferometer loops for modulating phase of the respective reference beams at selected modulation frequencies, thereby shifting beating frequencies of the detected interfering signals.

5. The system of claim 1, further comprising a control circuit configured and operable to receive detected signals from said detection unit, said detected signals being associated with coherence terms for beams in said first and second interferometer loops.

6. The system of claim 5, wherein said control circuit is configured and operable to determine a relation Γ (Gamma) between mutual coherence factors detected by said detection unit for said at least first and second interferometer loops, said relation Γ being indicative of a range to said target object.

7. The system of claim 6, wherein said control circuit is configured and operable to utilize data on effective coherence length for said at least first and second interferometer loops to determine range to said target object.

8. The system of claim 5, wherein said control circuit is configured for analyzing a variation frequency of the detected signals from said detection unit, said analyzing comprising determining peak frequency of variation of the detected signals and power of peak frequency components, a relation between power of peak frequency components of signals of the at least first and second interferometer loops being indicative of range to said target object.

9. The system of claim 1, wherein the at least first and second detectors of said detection unit are formed by at least first and second detector arrays, said optical arrangement comprises an imaging optical arrangement for generating an interference of image of said target object and respective first and second reference beams onto said first and second detector arrays, to thereby generate interference data of said image on the corresponding one of the first and second detector arrays respectively, thereby enabling range detection of a selected field of view.

10. The system of claim 1, further comprising a scanning unit configured for varying direction of an interrogating beam transmitted through at least one of the interrogating arm toward the target object, thereby enabling scanning of a field comprising said target object.

11. The system of claim 1, wherein said optical arrangement comprises at least one of: an optical fiber section, a free space propagation section, or a system on a chip section.

12. The system of claim 1, configured as a whole system on a chip.

13. A method for use in determining range to a target object, the method comprising:

a. providing an electromagnetic (EM) beam of certain coherence length;

b. directing at least first and second portions of the EM beam toward first and second reference arms;

c. directing at least a third portion of the EM beam toward said target object;

d. collecting reflected radiation comprising EM beam components reflected from said target object, and directing first and second portions of the reflected radiation to interfere with EM beams of said first and second reference arms, and determining first and second interference intensities associated with interference of said first and second portions of reflected light with light of said first and second reference arms respectively; and e. processing data on said first and second interference intensities to determine range to said target object;

wherein the method comprises applying selected noise affecting relative coherence between at least one of said first and second portions of illumination and said third portion of the EM beam.

14. The method of claim 13, wherein said processing comprises determining constant and mutual coherence portions of said first and second interference intensities and determining a ratio between mutual coherence factors of said first and second interference intensities.

15. The method of claim 13, wherein said processing comprises providing data on coherence lengths of light portions in said first and second reference arms and utilizing a relative difference in the coherence lengths for determining range to said target object.

16. A system comprising:

at least one light source unit configured to provide optical illumination having certain coherence length;

an optical arrangement comprising at least one splitting unit, said splitting unit being configured for directing said optical illumination to form at least one reference beam and at least one interrogating beam, and for directing said at least one interrogating beam toward a target;

a light collection unit configured for collecting light of said at least one interrogating beam reflected from said target, and direct collected light to a detection unit;

the detection unit comprising at least two detectors, each configured for detecting combined illumination formed by at least a portion of the at least one reference beam and a portion of the collected light and generating detection data, said detection data being indicative of a distance to said target; and wherein said at least one interrogating beam comprises at least two interrogating beams different between them in wavelength; and wherein the system comprises a noise generating unit configured to affect coherence length of light in one of said at least two interrogating beams the interrogating beams.

* * * * *